(12) United States Patent
Onyon (10) Patent No.: US 6,401,349 B1
(45) Date of Patent: Jun. 11, 2002

(54) SURFACE MEASURING APPARATUS (75) Inventor: Peter Dean Onyon, Leicestershire (GB)

(73) Assignee: Taylor Hobson Limited (GB)

( * ) Notice: Subject to any disclaimer, the term of this patent is extended or adjusted under 35 U.S.C. 154(b) by 0 days.

(21) Appl. No.: 09/066,404

(22) PCT Filed: Oct. 30, 1996

(86) PCT No.: PCT/GB96/02648

§ 371 (c)(1),
(2), (4) Date: Aug. 4, 1998

(87) PCT Pub. No.: WO97/16701

PCT Pub. Date: May 9, 1997

(30) Foreign Application Priority Data

Oct. 31, 1995 (GB) ............................................. 9522300

(51) Int. Cl.⁷ .............................. G01B 5/20; G01B 5/00
(52) U.S. Cl. .............................. 33/551; 33/549; 33/553
(58) Field of Search .......................... 33/503, 546, 547, 33/549–555, DIG. 9

(56) References Cited

U.S. PATENT DOCUMENTS

| 2,629,936 | A | * | 3/1953 | Cronstedt | 33/547 |
|---|---|---|---|---|---|
| 4,717,255 | A | | 1/1988 | Ulbers | |
| 4,744,661 | A | | 5/1988 | Ulbers et al. | |
| 4,807,152 | A | * | 2/1989 | Lane et al. | 33/503 |
| 4,821,425 | A | * | 4/1989 | Currie et al. | 33/551 |
| 4,890,421 | A | * | 1/1990 | Moore, Jr. et al. | 33/550 |
| 5,575,075 | A | * | 11/1996 | Sasaki | 33/503 |
| 5,621,978 | A | * | 4/1997 | Sarauer | 33/503 |
| 5,825,666 | A | * | 10/1998 | Freifeld | 33/503 |

FOREIGN PATENT DOCUMENTS

| EP | 0 036 251 A2 | 9/1981 |
|---|---|---|
| EP | 0 240 150 A2 | 10/1987 |
| EP | 0 242 407 A2 | 10/1987 |
| EP | 0 633 575 A2 | 1/1995 |
| GB | 1195240 | 6/1970 |
| GB | 2092753 A | 8/1982 |
| GB | 2 218 227 A | 11/1989 |
| GB | 2 237 661 A | 5/1991 |
| GB | 2 251 945 A | 7/1992 |
| GB | 2 294 327 | 4/1996 |
| WO | 95/25940 | 9/1995 |

OTHER PUBLICATIONS

Patent Abstracts of Japan, vol. 10, No. 149 (P–461) [2206], May 30, 1986 & JP 61 002009 A (Toshiba K.K.), Jan. 8, 1986.

Research Disclosure, No. 290, Jun. 1988, New York, NY, USA, p. 372 XP002025154 29019: "Form Profile/Height Gauge.".

A. Franks, "Nanometric surface metrology at the National Physics Laborabory," Nanotechnology 2 (1991), pp. 11–18, U.K.. (Jan. 1991).

* cited by examiner

Primary Examiner—Diego Gutierrez
Assistant Examiner—Mirellys Jagan
(74) Attorney, Agent, or Firm—Lerner, David, Littenberg, Krumholz & Mentlik, LLP (57) ABSTRACT A stylus is carried at one end of a support arm mounted so as to be pivotable about a pivot axis to allow the stylus to follow a surface during relative movement between the stylus and the surface. A drive arrangement is responsive to pivotal movement of the support arm to drive the support arm to maintain the support arm at a substantially constant attitude. A measuring arrangement is provided for measuring the displacement of the stylus. The measuring arrangement uses a measuring element mounted to one end of the support arm adjacent the stylus. The measuring arrangement may be an interferometer and the measuring element a corner cube mounted so as to be aligned with the tip of the stylus.

25 Claims, 8 Drawing Sheets

SURFACE MEASURING APPARATUS

BACKGROUND OF THE INVENTION

This invention relates to apparatus for measuring the profile of a surface. In particular, but not exclusively, this invention relates to apparatus for measuring the profile of a surface projecting transversely of an axis of rotation of an object, for example the profile of the cam surface on a video drum cam. The cam surface of a video drum cam is in the form of a narrow ledge extending radially outwardly of the drum and defining a helical path around the drum. This cam surface serves to guide a video tape along a helical path past the video recording and/or reproducing heads within a video tape recorder or player.

Rank Taylor Hobson Limited of Leicester, United Kingdom manufacture metrology instruments designed to measure surface profiles. For example the Form Talysurf series 2 Laser Traverse Unit has been used to enable measurement of the overall form or shape of a cam surface. In such apparatus, a stylus is carried at one end of a support arm which is mounted so as to be pivotable about a pivot axis to allow the stylus to follow the surface during relative movement between the stylus and the surface. The displacement of the stylus as the stylus follows the surface is detected using a transducer and the output of the transducer is logged together with signals indicating the position of the tip of the stylus along its line of travel to provide data giving a measurement of the surface profile.

An article by A. Frank entitled "Nanometric Surface Metrology at the National Physics Laboratory" published in Nanotechnology 11 (1991) at pages 11–18 describes a stylus laser profilometer wherein the surface to be measured is mounted on a carriage or slideway and a pivotally mounted stylus follows the profile of the surface as the slideway is moved relative to the stylus. The displacement of the stylus is measured by means of a double-pass interferometer comprising a roof prism which is cemented to the stylus so as to form the moving member of the interferometer. The static part of the interferometer is mounted directly above the roof prism and is rigidly referenced to the slideway.

In use of such apparatus, as the stylus follows the surface profile, the stylus inevitably moves through an arc of a circle centred on the pivot axis of the support arm. The result of this is a slight displacement of the stylus in the direction of movement of the carriage as the stylus pivots about the pivot axis. This slight displacement means that the measurement point is somewhat displaced from that which was intended and this may introduce errors into the measurement results. In addition, if such apparatus is used to follow a narrow surface or ledge such as the cam surface of a video drum cam, there is a possibility that the stylus may lose contact completely with the surface being measured.

SUMMARY OF THE INVENTION

In a first aspect, the present invention provides a metrological apparatus having a stylus carried by a support arm arranged to pivot about a pivot axis to allow the stylus to follow a surface during relative movement between the stylus and the surface and means for maintaining the support arm at a substantially constant attitude.

In a second aspect, the present invention provides apparatus for measuring the profile or shape of a surface of an object positioned so that the surface projects transversely of an axis about which relative rotation of a stylus and the surface is effected, the stylus being carried by. a support arm which is pivotable about a pivot axis to allow the stylus to follow the profile of the surface during relative rotation of the stylus and the surface, and means being provided for controlling the support arm to maintain the support arm at a substantially constant attitude.

In another aspect, the present invention provides a metrological apparatus comprising a support arm for carrying at one end a stylus, the support arm being arranged to pivot about a pivot axis to allow the stylus to follow a surface during relative movement between the stylus and the surface and means for maintaining the support arm at a substantially constant attitude.

In an embodiment of the present invention, inaccuracies in measurements resulting from the pivotal movement of the stylus support arm may be avoided or at least reduced because the support arm is maintained at a substantially constant attitude avoiding or at least reducing any displacement of the stylus due to pivotal movement of the support arm, thereby enabling an accurate determination of the location of the point being measured by the stylus. In addition, where the surface being measured is quite narrow, for example as in the case of a cam surface on a video cassette recorder drum cam, maintenance of the stylus on the relatively narrow surface or ledge may be facilitated.

Relative rotation may be effected by use of a turntable to support the object. It may, however, also be possible to mount the stylus support arm so that it is the stylus rather than the object which rotates about the axis of rotation.

Drive means may be used to maintain the support arm at a substantially constant attitude which may be, for example, horizontal or an angle to the horizontal. The actual angle at which the drive means maintains the support arm may be determined in accordance with the manufacturing tolerances within the apparatus and in accordance with the characteristics, for example, the inclination of the surface being measured so as to reduce measurement errors. Means may be provided f or adjusting the attitude of the support arm.

Movement of the stylus as it follows a surface may be measured by measuring means which may comprise an interferometer, although it may be possible to use an inductive means such as an LVDT (linear variable differential transducer).

A measuring element of the measuring means may be mounted, as close as is practically possible so as to be aligned with a tip of the stylus so that the measuring element provides a direct indication of the movement of the stylus without being affected by pivotal movement of the support arm. For example, where the measuring means comprises an interferometer, then the measuring element may comprise a retroreflector which is aligned with the tip of the stylus. As an example, the retroreflector may comprise a corner cube having its apex aligned with the stylus tip.

To maintain the support arm at a substantially constant attitude, an LVDT having one of its core and coil, generally the core, coupled to the support arm and feedback means for driving the support arm to maintain a predetermined output from the LVDT may be used. As another possibility, an optical transducer may be used in place of the LVDT.

In another aspect, the present invention provides measurement apparatus having a number of selectable stylus support members each defining a different separation between a stylus tip and a measuring element.

DETAILED DESCRIPTION

Figure 1:
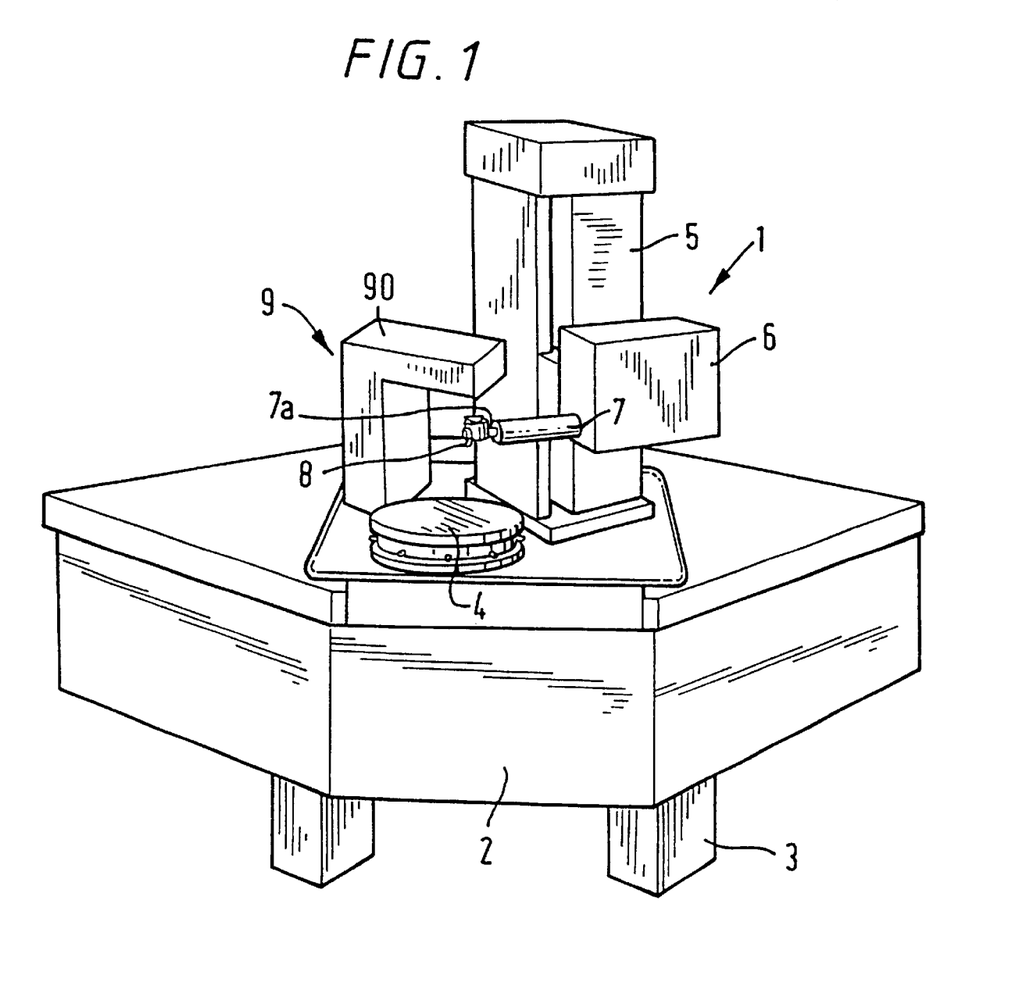
FIG. 1 shows a schematic perspective view one embodiment of apparatus in accordance with the invention.

Referring now to the drawings, FIG. 1 shows apparatus or a metrological instrument 1 mounted on a work bench 2 having feet 3 (only two of which are shown). A turntable 4 for supporting a workpiece or object (not shown) on a high accuracy air bearing spindle is mounted on the work bench together with a support column 5 carrying a carriage 6 moveable along the support column 5 in a vertical direction. The instrument 1 may be mounted on a support surface 1a separate from the workbench 2 to enable the instrument to be transported to other working locations.

As will be described in greater detail below, a support arm 7 is pivotally mounted within the carriage 6 so as to be pivotable about an axis extending in a direction parallel to the support surface 1a (that is generally parallel to the horizontal) and perpendicular to the length of the support arm 7. A free end 7a of the support arm 7 carries a stylus 8 which may be of any conventional form suitable for use with a pivotable support arm and which is arranged to contact the surface of a workpiece (not shown). Typically, the stylus 8 will have a tip with a radius in the range of from 2 to 10 micrometres, although a radius of up to 0.5 mm may be possible.

The apparatus 1 is provided, as will be described in detail below, with a measurement arrangement 9 in the form of an interferometer for measuring displacement of the stylus 8.

Figure 2:
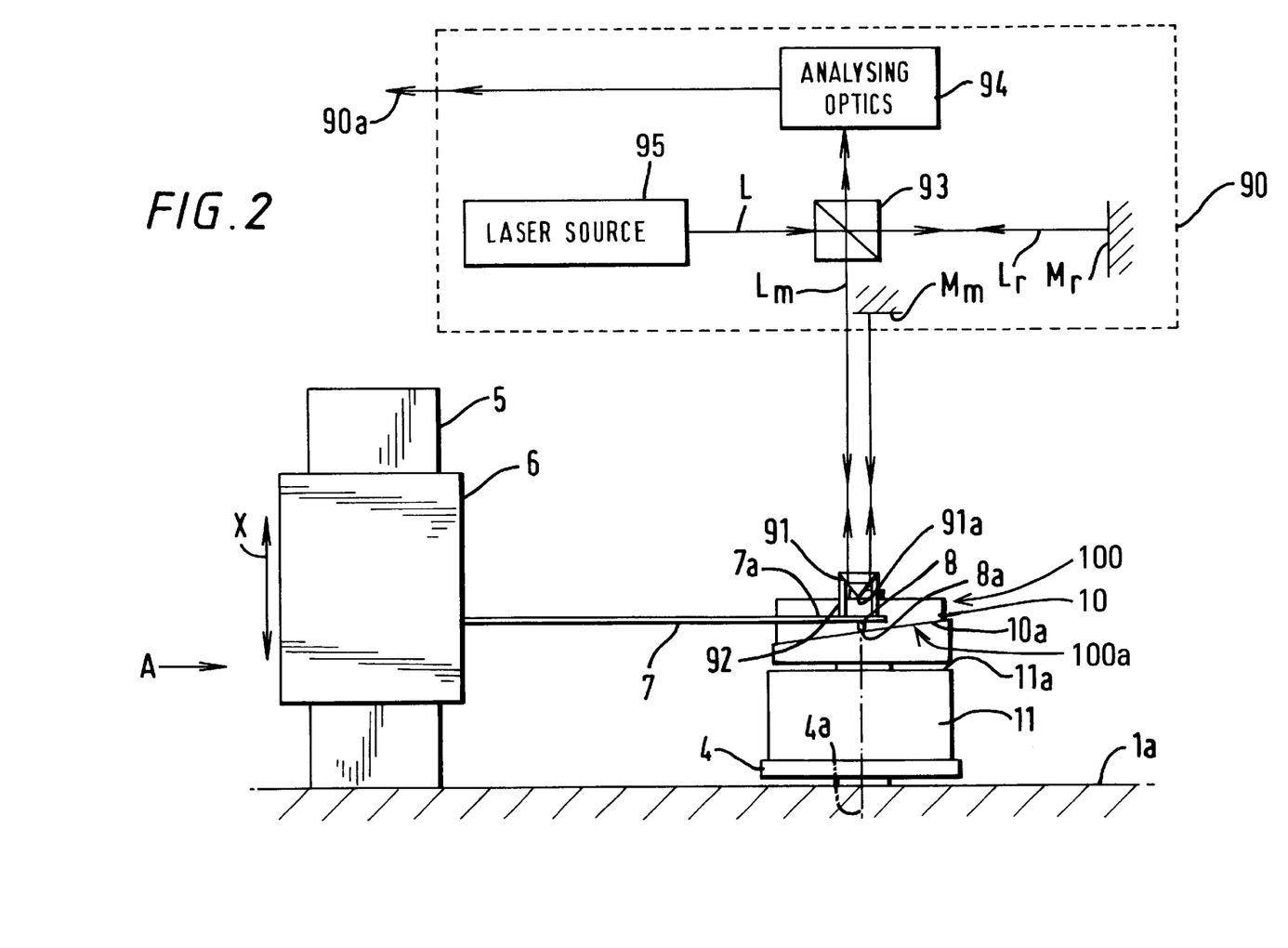
FIG. 2 shows a diagrammatic view of part of the apparatus shown in FIG. 1 so as to explain its operation.

The interferometer 9 is shown in more detail in FIG. 2 which shows part of the apparatus shown in FIG. 1.

A workpiece 100 having a surface 100a whose profile to be measured is mounted on the turntable 4. The workpiece 100 may be a video drum cam 10 having a circumferentially extending helical cam surface 10a for guiding a video tape along a helical path within a video tape recorder or player, as is known in the art.

The video drum cam 10 is mounted on a support 11 fixedly secured to the turntable 4 so as to maintain the video drum cam 10 at an appropriate height allowing clearance for movement of the carriage 6 as will be described below. Of course, if such clearance is not a problem, then the video drum cam 10 could be mounted directly upon the turntable 4. The video drum cam 10 may be secured to the support 11 by any suitable arrangement, for example a clamping arrangement of known form.

The measuring arrangement 9 comprises a retroreflector in the form of a cube corner 91 mounted by mounting means 92 to the free end 7a of the support arm 7 adjacent the stylus 8. The cube corner 91 is mounted so that its apex 91a is, as close as is practically possible, vertically aligned with the tip 8a of the stylus 8 so as to minimise or at least reduce the effect on measurements of rotation of the support arm 7 about the pivot axis. The cube corner 91 may be formed of any suitable glass or plastics material.

It may be possible to use other forms of retroreflectors, for example silvered mirrors or the like with appropriate modification of the interferometer design, for example with the addition of quarter wave plates to rotate the polarisation state, if silvered mirrors are used.

The cube corner 91 forms the moving part of the interferometer 9, that is the cube corner 91 moves with the stylus 8. The remaining part 90 (indicated by the dashed box in FIG. 2) of the interferometer is fixedly mounted to the apparatus in a suitable housing. As shown in FIG. 1, the stationary part 90 of the interferometer is mounted to the work bench 2. The stationary part 90 of the interferometer could, alternatively, be mounted to the support column 5.

The stationary part 90 of the interferometer may be of any conventional form, for example of the form used in the applicants' Form Talysurf series of apparatus. As shown schematically in FIG. 2, the fixed part 90 of the interferometer comprises a suitable laser source 92 which directs an output laser beam L towards a beam splitting prism 93. A first reference beam $L_r$ passes through the beam splitter prism to be reflected by a reference mirror $M_r$ while a measurement second beam $L_m$ is reflected by the beam splitter 93 toward the cube corner 91.

The measurement beam $L_m$ is reflected by the cube corner 91 to a measurement mirror $M_m$ which reflects the measurement beam back via the cube corner 91 to the beam splitter 93. The beam splitter supplies the combined measurement and reference beams $L_m$ and $L_r$ to analysing optics 94 which may be of any suitable conventional form as discussed above. The analysing optics 94 determines from the interference fringes between the measurement and reference beams $L_M$ and $L_R$ the path or phase difference between the two beams which, of course, gives an indication of the displacement of the cube corner 91 and thus of the stylus 8. The interference fringes produced by the interferometer may be counted by any suitable conventional means.

In an embodiment, the interferometer is a polarising interferometer having analysing means or optics as described in EP-A-0036251 (the whole contents of which are herein incorporated by reference) and used in the applicants' Form Talysurf series apparatus to provide two quadrature electrical output signals which are proportioned to cos δ and sin δ (where δ is the phase or path difference between the measurement and reference beams) which can then be supplied to a counter which counts bidirectionally in increments relating to a phase change of $\pi/10$ of the input signals to enable a determination as to whether the displacement of the stylus is positive or negative (that is up or down) with reference to the nominal reference attitude of the stylus support arm 7. If desired, for example to reduce costs, the cube comers used in the interferometer shown in FIG. 2 of EP-A-0036251 may be replaced by plane reflectors associated with quarter wave plates.

Figure 3:
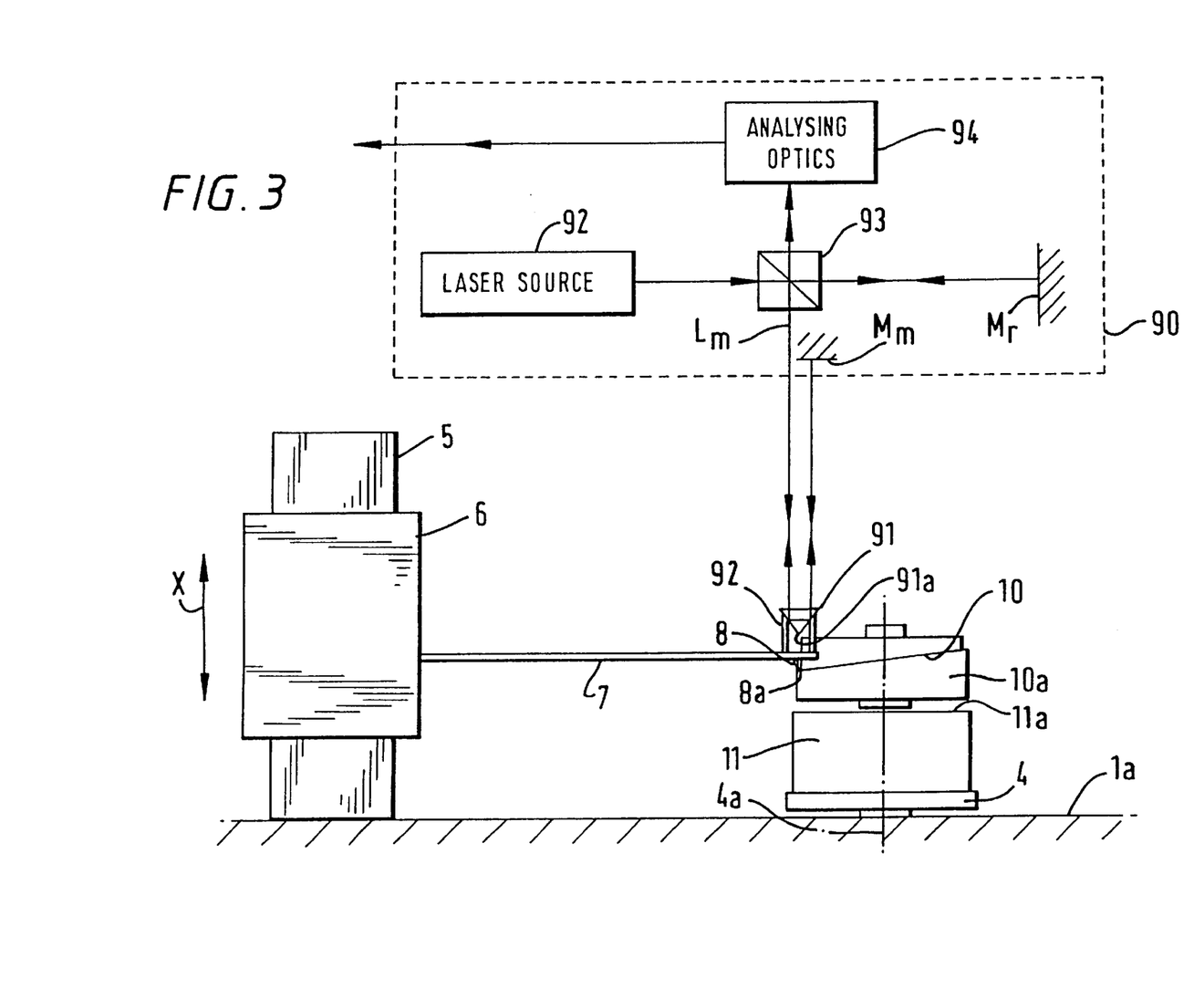
FIG. 3 shows a view similar to FIG. 2 of a modified arrangement for the apparatus shown in FIG. 1.

As shown in FIG. 2, the stylus 8 and support arm 7 are arranged so as to extend tangentially of the circumferential surface of the video drum cam 10 so as to follow the cam surface 10a. However, as illustrated in FIG. 3, the stylus 8 and support arm 7 may be arranged so as to extend radially of the video drum cam 10.

Figure 4A:
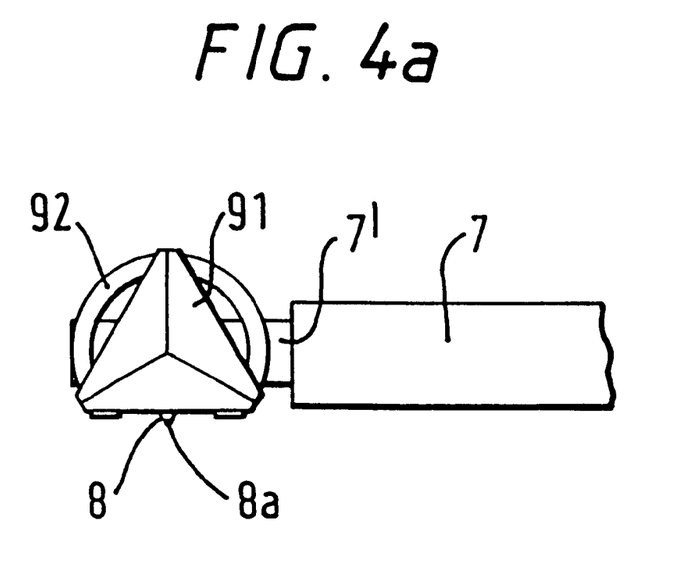
FIGS. 4a and 4b are enlarged top plan and side views, respectively, of an end portion of a stylus support arm of an embodiment of apparatus in accordance with the invention showing the mounting of a stylus and measuring element to the support arm.
Figure 4B:
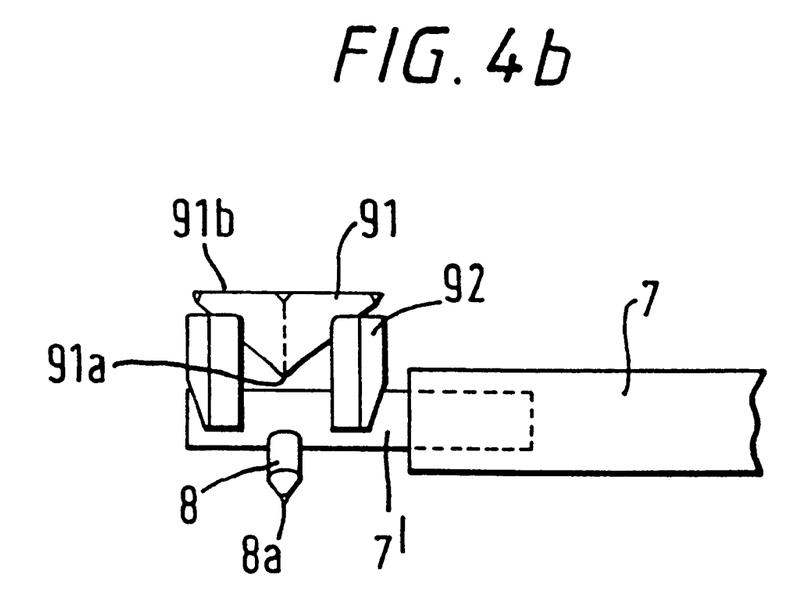

FIGS. 4a and 4b are enlarged top plan and side views respectively of an end portion of the stylus support arm 7 to show in more detail the mounting of the stylus 8 and cube corner 91 to the support arm 7.

As shown most clearly in FIG. 4b, the support arm 7 has a reduced cross-section (generally diameter) end portion 7' which carries the stylus 8 and a mounting means 92 of the cube corner 91. In this example the mounting means 92 defines a part circular annulus mounting surface on which the three corners of the top surface of the cube corner 91 rest. This enables the cube corner 91 to be aligned in situ before being finally fixed in position using a suitable adhesive, cement or the like. The mounting means 92 is shaped so as not to extend beyond the cube corner 91 in the direction which in use faces the surface being measured so as to reduce the possibility of the mounting means 92 interfering with the surface or workpiece being measured.

The stylus 8 has, as shown in FIG. 4b, a generally cylindrical body which projects radially of the longitudinal axis of the support arm end portion 7' so that the axis of the stylus body is inclined at an angle to the support surface 1a. The cylindrical body of the stylus 8 has a generally conical end portion which carries the stylus tip 8a. Generally, the stylus tip is a diamond or possibly a sapphire tip. The stylus tip 8a and cube corner 91 should be located so that a line from, the stylus tip 8a to the pivot axis of the support arm is parallel to the top surface of the cube corner 91.

The support arm 7, end portion 7', stylus 8 and mounting means 92 are generally formed of suitable metals such as stainless steel or the like and may be secured to one another, as appropriate, using any suitable known technique. As can be seen from FIG. 4b, the mounting means 92 defines the height of the apex 91a of the cube corner 91 above the stylus tip. In order to enable the stylus tip 8a to follow a surface such as the cam surface of a video drum cam, the stylus tip 8a is, as shown in FIG. 4a, not quite aligned with the apex 91a of the cube corner 91 but is slightly offset from the cube corner 91 in a direction towards the surface being measured so as to inhibit any mechanical interference between the surface being measured, the mounting means 92 and the cube corner 91. Typically the offset may be about 5 mm (millimetres). Of course, where such mechanical interference is not likely, then the stylus tip 8a may be precisely aligned with the apex 91a. As another possibility, the mounting means 91 may be modified and the height of the cube corner 91 above the stylus tip 8a chosen so that there can be no mechanical interference with the surface or workpiece being measured even when the stylus tip is aligned with the apex 91a. Such an arrangement would however limit the possibilities for adjusting the height of the apex 91a above the stylus tip 8a. Although not shown in FIGS. 1 to 4b, the support arm 7 may be biased by use of weights or biasing springs to provide a stylus tip force additional to that provided by gravity.

Although not shown in FIGS. 1 to 3, a motor cooperates with a cable and pulley arrangement (or other suitable means such as a sprocket wheel and chain) provided within the support column 5 for driving the carriage 6 in the direction X indicated in FIGS. 2 and 3 along the support column 5.

Figure 5:
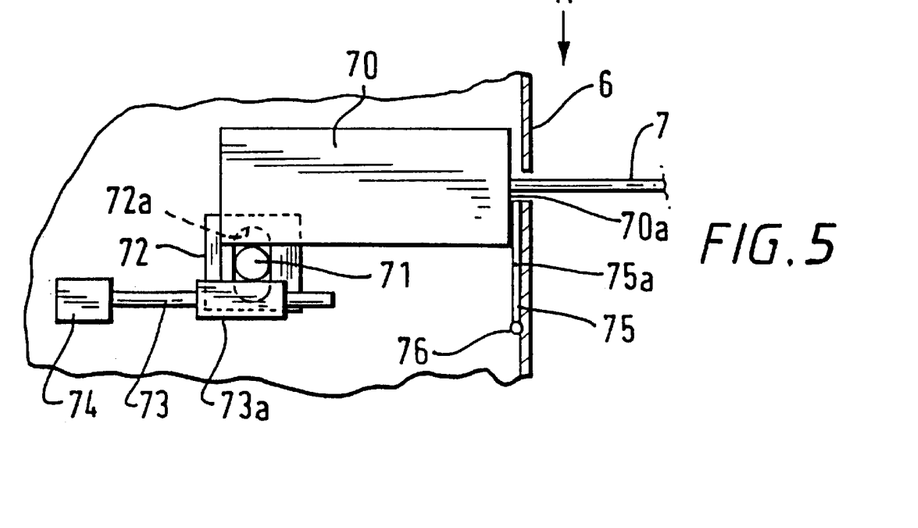
FIG. 5 shows a very schematic cut-away view of part of the apparatus shown in FIG. 1 for illustrating the mounting within a carriage of a housing carrying a support arm of a stylus of an embodiment of apparatus in accordance with the invention.

FIG. 5 illustrates the mounting of a housing 70 of the support arm 7 within the carriage 6.

A rear end of the housing 70 carries a roller 71 whose ends are journalled in elongate slots 72a formed in mounting blocks 72 (one of which is shown in FIG. 5). The roller 71 rests on moveable support means adapted to support the roller at different heights within the slots 72a. In the arrangement shown, the moveable support means comprises a rod 73 having an enlarged diameter portion 73a upon which the roller 71 normally rests. The rod 73 and/or the enlarged portion 73a are moveable relative to the roller 71. For example, the rod 73 and enlarged portion 73a may comprise a worm gear and captured nut arrangement or a rack and pinion or other similar drive arrangement which enables a motor 74 to cause the enlarged portion 73a to move along the rod 73. A biasing member in the form of a leaf spring 75 is mounted to an interior surface of the carriage 70 by a mounting member 76. The leaf spring 75 acts on a front face 70a of the housing 70 and exerts a biasing force on the housing 70 in a direction tangential to the circumference of a circle centred at a midpoint 75a of the leaf spring biasing member 75. Normally, the roller 71 holds the housing 70 in the position shown in FIG. 5 against the biasing force of the biasing member 75.

Figure 6A:
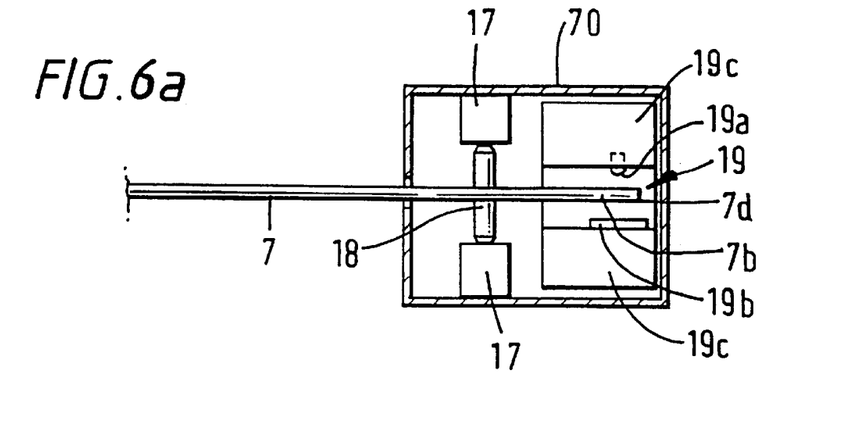
FIG. 6a shows a schematic part sectional view of part of the apparatus shown in FIG. 1 for illustrating one example of the mounting of the support arm within the housing shown in FIG. 5.

FIG. 6a shows a view taken in the direction of the arrow A in FIG. 5 of the stylus arrangement with the housing 70 cut away to show one example of a mounting arrangement for the support arm 7 wherein an optical transducer is used to detect pivotal movement of the support arm 7.

As shown in FIG. 6a, the support arm 7 carries a pivot pin 18 which is received in bearings 17 mounted to the housing to enable the support arm 7 to pivot about a pivot axis defined by the pivot pin 18. The bearings 17 may be, for example, three-ball cup bearings. Of course, any other suitable arrangement for pivotally mounting the support arm 7 within the housing 70 may be provided.

The other end 7b of the support arm or an extension of the support arm 7 extends beyond the pivot pin 18 to be received between the light emitting and light receiving components 19a and 19b of an optical transducer 19. The light emitting and light receiving components 19a and 19b of the optical transducer may be mounted to respective mounting blocks 19c or directly to the housing 70, as appropriate.

In this example, the light emitting component 19a comprises a light emitting diode while the light receiving component 19b comprises two rectangular photodiodes arranged one above another. The end 7b of the support arm 7 carries an optical shutter fin 7d which is arranged to be non-reflecting and light absorbing or has a light absorbent coating. For example, the optical shutter fin 7d may be matt black.

An optical transducer arrangement of the type shown in FIG. 6a is described in the applicants' International Patent Application Publication No. WO95/25940 (Application No. PCT/GB95/00559), the whole contents of which are incorporated herein by reference.

As described in WO95/25940, the upper photodiode remains exposed to light from the light emitting element 19a to act as a gain control. Pivotal movement of the support arm 7 carrying the optical shutter fin 7d varies the exposure of the lower photodiode of the light receiving component 19b to the light emitting element 19a and so the electrical signal from the lower photodiode varies with the pivotal movement of the support arm 7. The outputs from the two photodiodes may be input to a variable gain amplifier (not shown) to obtain a signal dependent on their ratio or the energising current supplied to the light emitting element 19a may be controlled through a feedback arrangement so as to maintain the output of the upper photodiode constant. If desired the gain control photodiode may be omitted. Of course, other photoelectric conversion elements such as phototransistors or the like may be used.

Figure 6B:
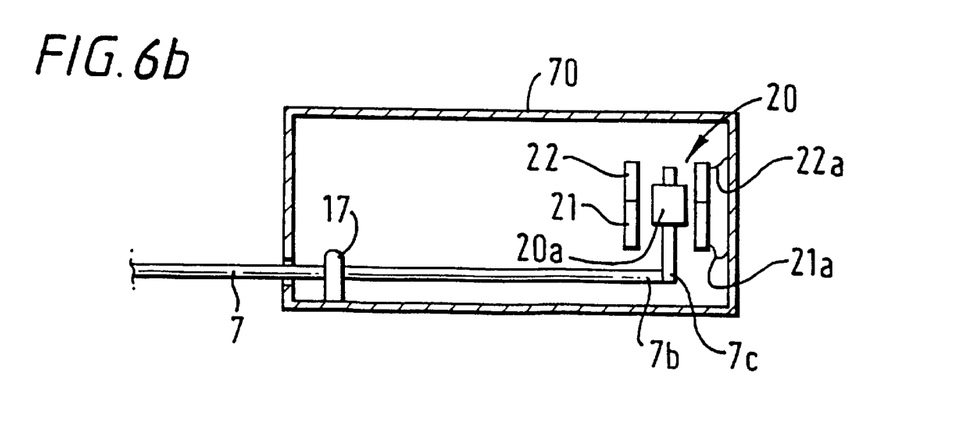
FIG. 6b shows a schematic part sectional view of part of the apparatus shown in FIG. 1 for illustrating another example of the mounting of a support arm within the housing shown in FIG. 5.

FIG. 6b is a part cut-away view taken in a direction perpendicular to the direction A in FIG. 5 of another arrangement for detecting pivotal movement of the support arm 7. Again, the support arm 7 is pivotally mounted by any suitable pivotal mounting arrangement, for example, an arrangement similar to that shown in FIG. 6a.

In the example shown in FIG. 6b, the other end 7b of the support arm 7 located within the housing 70 of the carriage has a projection 7c extending perpendicularly thereof. The projection 7c carries a magnetic armature or core 20a of a linear variable displacement transducer (LVDT) 20. The magnetic armature 20a is surrounded by coils 21, 22 of the LVDT which are shown only schematically in FIG. 6b. It will, of course, be appreciated that as an alternative, the armature may be mounted to the housing 70 and the coils mounted to the other end 7b of the support arm 7. Leads 21a and 22a of the coils 21 and 22 are coupled to terminals (not shown) for enabling signals to be supplied to and from the LVDT. The LVDT may as another possibility have a single centretapped coil rather than two separate coils.

The LVDT 20 may operate in a conventional manner to produce a null output when the armature 19 is positioned-midway between the coils 21 and 22 as shown in FIG. 6b. It will be appreciated that pivotal movement of the support arm 7 as the stylus 8 follows the surface whose profile is being measured will cause the LVDT to produce a signal of increasing magnitude whose phase or polarity depends on the direction in which the stylus 8 has moved away from the null position, that is whether the stylus has moved up or down in FIG. 6b.

The sensitivity of the optical transducer 19 or the LVDT 20 to pivotal movement of the support arm 7 may be increased by positioning the pivot axis 18 closer to the stylus 8 than to the optical transducer 19 or LVDT 20 so that the optical shutter fin 7d or armature 20a moves through a greater distance than the stylus 8 for a given angle of rotation about the pivot axis 18.

Figure 7:
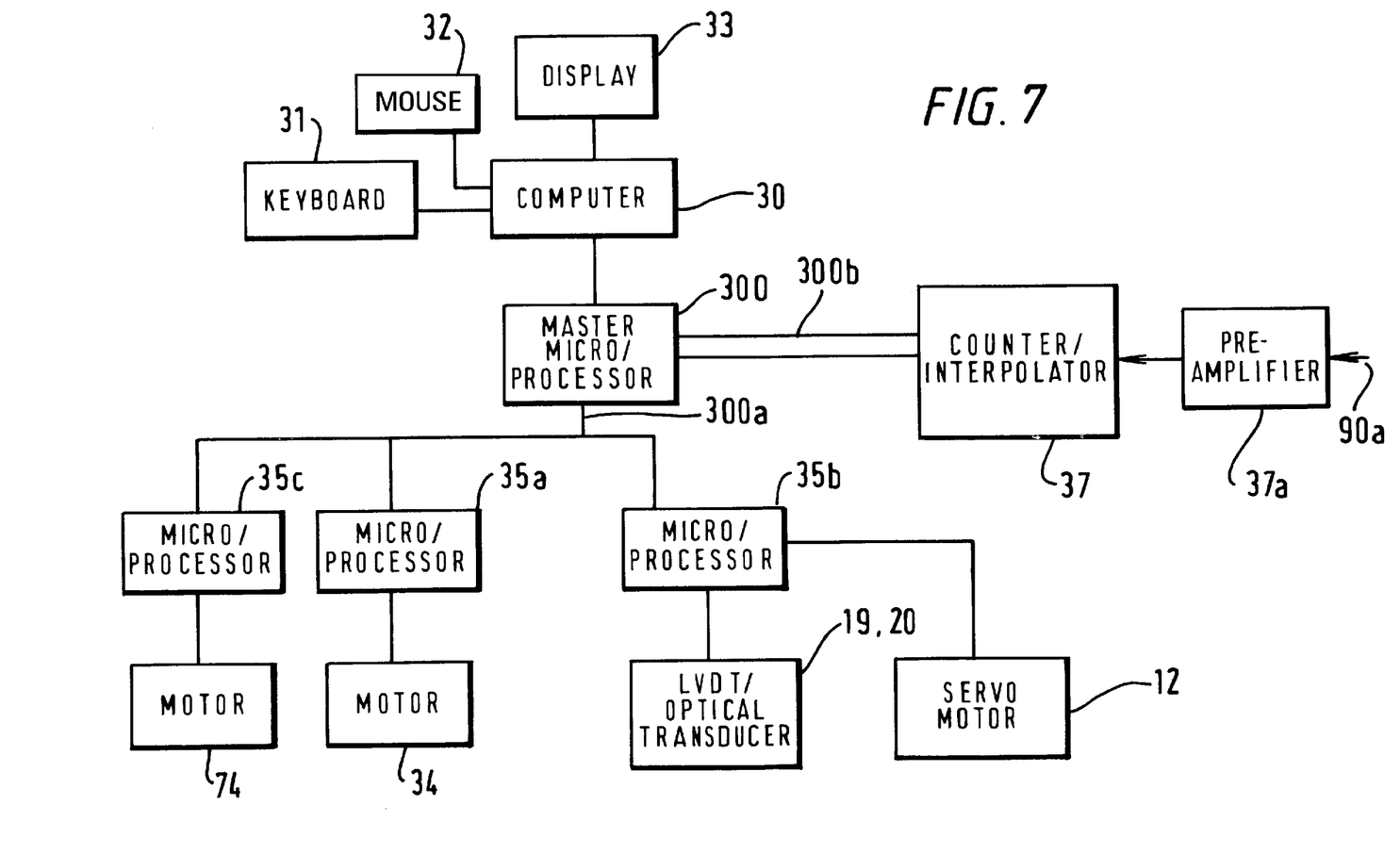
FIG. 7 shows a block diagram of processing circuitry for the apparatus shown in FIG. 1.

As shown in FIG. 7, the apparatus comprises a processing system with a computer 30 programmed to perform metrological operations together with a keyboard 31 and possibly a pointing device such as a mouse 32 for inputting instructions and a display 33 for displaying output data. Although not shown in FIG. 7, the computer may also be associated with a printer for obtaining, in known manner, a hard copy of the output data.

The computer 30 is coupled to a master microprocessor 300 which is coupled via a serial bus 300a to three slave microprocessors 35a, 35b and 35c. The slave microprocessor 35a controls a motor 34 for effecting rotation of the turntable 4 while the slave microprocessor 35b controls a motor 12 for moving the carriage 6 along the support column 5 and the slave microprocessor 35c controls the motor 74 shown in FIG. 5. The microprocessor 35b also receives the output signals from the optical transducer 19 or LVDT 20 and uses these signals to control operation of the servo motor 12 so as to maintain the output of the optical transducer 19 or LVDT 20 at a desired value, for example at the null position of the LVDT 20.

The processing system also includes a counter/interpolator 37 coupled via a parallel bus 300b to the master microprocessor 300. The counter/interpolator 37 receives, via a pre-amplifier 37a, the output 90a of the interferometer 9 and provides, via the parallel bus 300b, a count indicative of the position of the stylus tip 8a to the master microprocessor 300. This count is used by the computer 30 to determine, in known manner, the vertical displacement of the stylus tip 8a from a vertical reference position.

In use of the apparatus shown in FIGS. 1 to 7, it is desirable from time to time to calibrate the apparatus to ensure that, for example, the support column 5 is precisely parallel to the spindle axis 4a of the turntable. This is achieved by placing a standard cylinder of metrologically known dimensions onto the turntable 4 and centring and levelling the standard cylinder on the turntable in a known manner as described in, for example, EP-A-0240150 or pending UK Application No. 9421013.5, the whole contents of both of which are herein incorporated by reference, and by replacing the stylus 8 with a known form of cylindricity measurement stylus such as that used in the Talyrond series of machines produced by the applicants. Measurements along the length or height of the cylinder are then taken in a manner known for the Talyrond series of machines so as to determine whether or not the support column or vertical datum slideway 5 is correctly aligned and parallel to the spindle axis 4. Adjustments of the alignment may be carried out in known manner if required.

In contrast, calibrating apparatus in which there is no compensation for pivotal movement of the support arm is not as straightforward because it creates a quasi-measurement line which cannot be checked directly but is implicit.

Once the alignment of the support column 5 with the spindle axis 4a has been determined, then the object whose surface is to be measured, mounted if necessary on a support 11 (as shown in FIG. 2) is centred and levelled on the turntable 4 in the manner described above. In the arrangement shown in FIG. 2, the object having a surface to be measured is a video drum cam 10 and the support arm 7 is arranged so as to extend tangentially of the circumference of the video drum cam 10 when the stylus 8 rests on the cam surface 10a.

Measurements of the vertical displacement of the stylus tip 8a are made at predetermined angular separations as the turntable 4 (and thus the video drum cam 10) is rotated about the spindle axis 4 so as to determine the profile of the cam surface 10a. As the stylus 8 follows the cam surface 10a, the support arm 7 will pivot freely about the pivot axis 18. Pivoting of the support arm 7 causes movement of the shutter fin of the optical transducer 19 or of the armature 20a of the LVDT 20 so supplying signals to the microprocessor 35b which provides, in any conventionally known manner for example via an analog-to-digital converter or a pulse width modulator, signals to the servo motor 12 of the carriage 6 so as to move the carriage 6 up or down the support column 5 to maintain the support arm 7 at a constant attitude ('the control attitude'), nominally horizontal. In this way, as the cam surface 10a rotates beneath the stylus tip 8, the whole of the carriage 6 and stylus support arm 7 effectively follow the cam surface 10 because the position of the carriage 6 is continually corrected by the feedback servo or follower arrangement provided by the optical transducer 19 (or the LVDT 20), microprocessor 35b and servo motor 12 to maintain the stylus support arm 7 at its constant predetermined attitude.

As indicated above, to make measurements of the profile of the cam surface 10a, the video drum cam 10 is centred and levelled on the high accuracy spindle 4 and, with the stylus tip 8a in contact with the cam surface or lead line 10a, the turntable 4 is rotated about its spindle axis 4a and readings from the interferometer are logged by the computer 30 at specific points in the rotation about the spindle axis 4a.

As the stylus 8 follows the cam surface 10a, the cube corner 91 moves in a straight line at a constant attitude to the interferometer light beam $L_m$. If the stylus tip 8 and thus the cube corner 91 were actually allowed to rotate about the pivot axis 18, that is if the follower arrangement was not active, the optical path length through the cube corner 91 would change with the rotation because of the change in the angle of incidence. Maintaining the support arm 7 and thus the cube corner 91 at a constant attitude maintains a constant angle of incidence and thus removes this error from the measurement.

Also, as indicated above, the tip 8a of the stylus 8 does not move in an arc but, by virtue of the follower arrangement, moves in a straight line. There is therefore no need for any complex data analysis to compensate for tangential position variations of the measuring point which would require a knowledge of the measurement radius. It should also be noted that the measurement radius would change if the stylus tip 8a moved through an arc with the result that the measurement point would move across the cam ledge 10a during the measurement. This would introduce radial ledge profile data into the circumferential lead line measurement data.

Furthermore, because the apex of the cube corner 91 is positioned as close as possible to the measurement point, namely the tip 8a of the stylus 8, any tilting of the carriage 6 on the support column or vertical datum slideway 5 or any position errors in the follower arrangement will introduce minimum error into the measurement because the effective lever length from the stylus tip 8a to the cube corner 91 is nominally zero or very small.

Also, because the support arm 7 is maintained at a constant attitude, the apparatus allows a wide measurement range limited only by the coherence length of the laser source 92.

The apparatus described above may also be used to determine the absolute height of the cam surface 10a above the base of the video drum cam by making measurements with reference to a flat surface held against the bottom face of the video drum cam, for example the surface 11a of the support 11 shown in FIG. 2. To make this measurement, the turntable spindle 4 is rotated to a particular angular position with the follower arrangement active. Once at that particular angular position, the rotation of the spindle 4 is stopped and a reading from the interferometer 9 recorded. The stylus tip 8a is then moved a short distance radially to take it off the cam surface or ledge 10a. This is achieved by actuating the motor 74 to move the enlarged portion 73a away from the roller 71 so allowing the biasing member 75 to cause the housing 70 to rotate about the axis defined by the roller 71. The follower arrangement then causes the carriage 6 to descend until the stylus tip makes contact with the reference surface 11a (see FIG. 2). Once the follower servo arrangement has brought the support arm 7 back to its preset attitude, the interferometer reading is again recorded. The difference between the two readings gives the measure of the absolute height of the cam profile above the bottom surface of the video drum cam at that position.

Figure 8A:
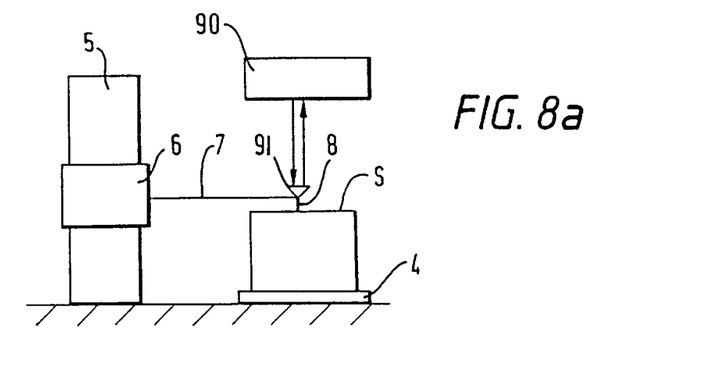
FIG. 8a is a very diagrammatic side view of an embodiment of apparatus in accordance with the invention.

The relationship of measurement errors to errors in the follower carriage 6 position may be optimised for each particular measurement situation. This relationship depends upon the stylus support arm 7 length, the height of the cube corner 91 apex 91a above the stylus tip 8a, the dimensions and refractive index of the cube corner 91 and the inclination of the surface being measured. This can be demonstrated by carrying out measurements on a known calibrated flat surface S as indicated diagrammatically by FIG. 8a with the follower arrangement disabled and determining the change in the interferometer reading I as a function of the position Z of the carriage 6 along the support column 5 with the null or zero position of the carriage 6 being taken to be that position at which the support arm 7 is parallel to a reference plane defined by the plane of the mirror Mm, which reference plane is generally horizontal in practice.

Figure 8B:
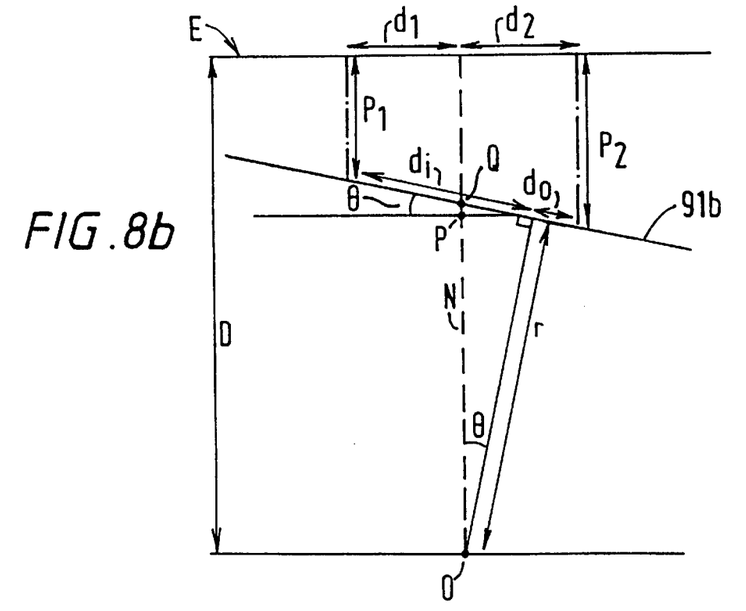
FIGS. 8b to 8d are diagrams for explaining the effect of tilting of the support arm and surface being measured on the measurement results and FIGS. 8e and 8f are graphs for illustrating the relationship between the output I of an interferometer of the apparatus and movement Z of a carriage supporting the support arm with the stylus tip resting on a flat inclined surface. It should of course be understood that the drawings are not to scale and that like parts are referred to by like reference numerals in the drawings.
Figure 8C:
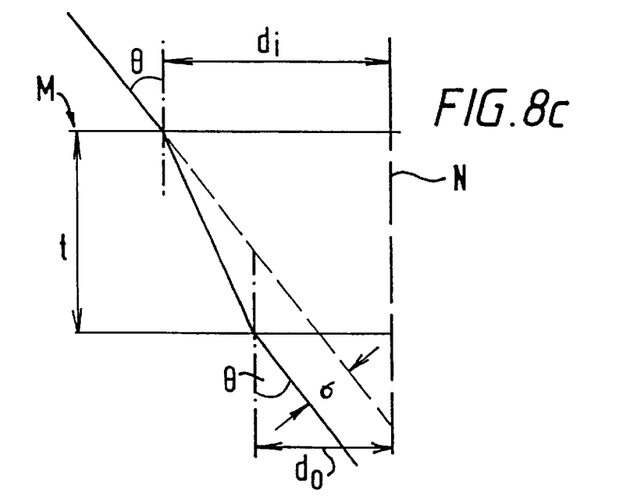

Movement of the carriage 6 along the support column 5 with the follow arrangement disabled causes the support arm 7 and thus the top surface 91b of the cube corner 91 to tilt away from the reference plane. FIGS. 8b and 8c are geometric diagrams for illustrating the effect of tilting of the support arm 7 and thus of the corner cube top surface 91b.

In FIG. 8b, D is a distance from the stylus tip 8a to an arbitrary plane AP parallel to the reference plane, r is the distance from the stylus tip 8a at O to the top surface 91b of the cube corner along the optical axis of the cube corner, $p_1$ and $p_2$ are the path lengths in air from the top surface 91b of the cube corner 91 to the arbitrary plane E, N is the normal to the arbitrary plane E passing through the stylus tip position O, $d_1$ and $d_2$ are the distances, parallel to the arbitrary plane E, from the normal N to the positions of incidence of the light paths $p_1$ and $p_2$ of the top surface 91b of the cube corner 91, $d_i$ and $d_o$ are the distances along the top surface 91b from the positions of incidence of the light paths $p_1$ and $p_2$ to the optical axis of the cube corner and $\theta$ is the angle of the support arm 7 and thus of the top surface 91b to the arbitrary plane E.

FIG. 8c shows the optical path through the cube corner 91 represented as the optical path through a medium m of thickness t having a refractive index n where refraction through the medium m causes the light path to deviate by a distance a from the path which would have been followed in the absence of the medium m.

From FIG. 8b, the distance OQ from the stylus tip 8a to the top surface 91b along the normal N is:

$$OQ = r\cos\theta + r\sin\theta\tan\theta \quad (1)$$

The total air path length $p_1 + p_2$ is:

$$p_1 + p_2 = 2(D - OQ) + (d_1 - d_2)\tan\theta \quad (2)$$

and $d_i$ is given by the expression:

$$d_i = \frac{d_1}{\cos\theta} + r\tan\theta = \left(\frac{d_1 + r\sin\theta}{\cos\theta}\right) \quad (3)$$

From FIG. 8c:

$$d_o = d_i - t\tan\theta + \frac{\sigma}{\cos\theta} \quad (4)$$

$$d_o = d_1 + \left(\frac{\sigma - t\sin\theta}{\cos\theta}\right) \quad (4)$$

From FIG. 8b $$d_2 = (d_o + r\tan\theta)\cos\theta \quad (5)$$

substituting for $d_o$ and $d_i$ from equations (3) and (4) gives:

$$d_2 - d_1 = \sigma + (2r - t)\sin\theta \quad (6)$$

so that equation (2) becomes:

$$p_1 + p_2 = 2D - 2r\cos\theta - 2r\sin\theta\tan\theta + (\sigma + (2r - t)\sin\theta)\tan\theta \quad (7)$$

using the small angle approximations:

$$\sin\theta = \theta; \cos\theta = 1 - \frac{\theta^2}{2}; \tan\theta = \theta \quad (8)$$

and putting D=r gives:

$$p_1 + p_2 = (r - t)\theta^2 + \sigma\theta \quad (9)$$

using the expression for $\sigma$ (FIG. 8c):

$$\sigma = t\sin\theta\left[1 - \frac{\cos\theta}{\sqrt{n^2 - \sin^2\theta}}\right] \quad (10)$$

and the small angle approximations gives:

$$\sigma = t\left(n - \frac{1}{n}\right)\theta \quad (11)$$

substituting in (9) then gives:

$$p_1 + p_2 = \left(r - \frac{t}{n}\right)\theta^2 \quad (12)$$

Adding the cube corner optical path length change $$C = \frac{n^2 t}{\sqrt{(n^2 - \sin^2\theta)}} - nt \quad (13)$$

and using the small angle approximations to give:

$$C = \frac{t}{2n}\theta^2 \quad (14)$$

The total interferometer path length change is then:

$$p_1 + p_2 + C = \left(r - \frac{t}{n}\right)\theta^2 + \frac{t\theta^2}{2n} = \left(r - \frac{t}{2n}\right)\theta^2 \quad (15)$$

Therefore the change in the interferometer path length, and thus the change in the interferometer reading I, with θ defines a parabola.

Figure 8D:
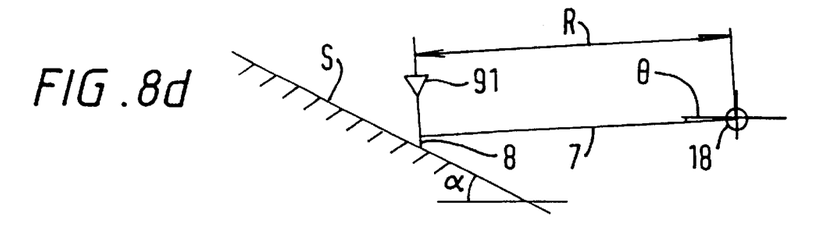
Figures 8E, 8F:
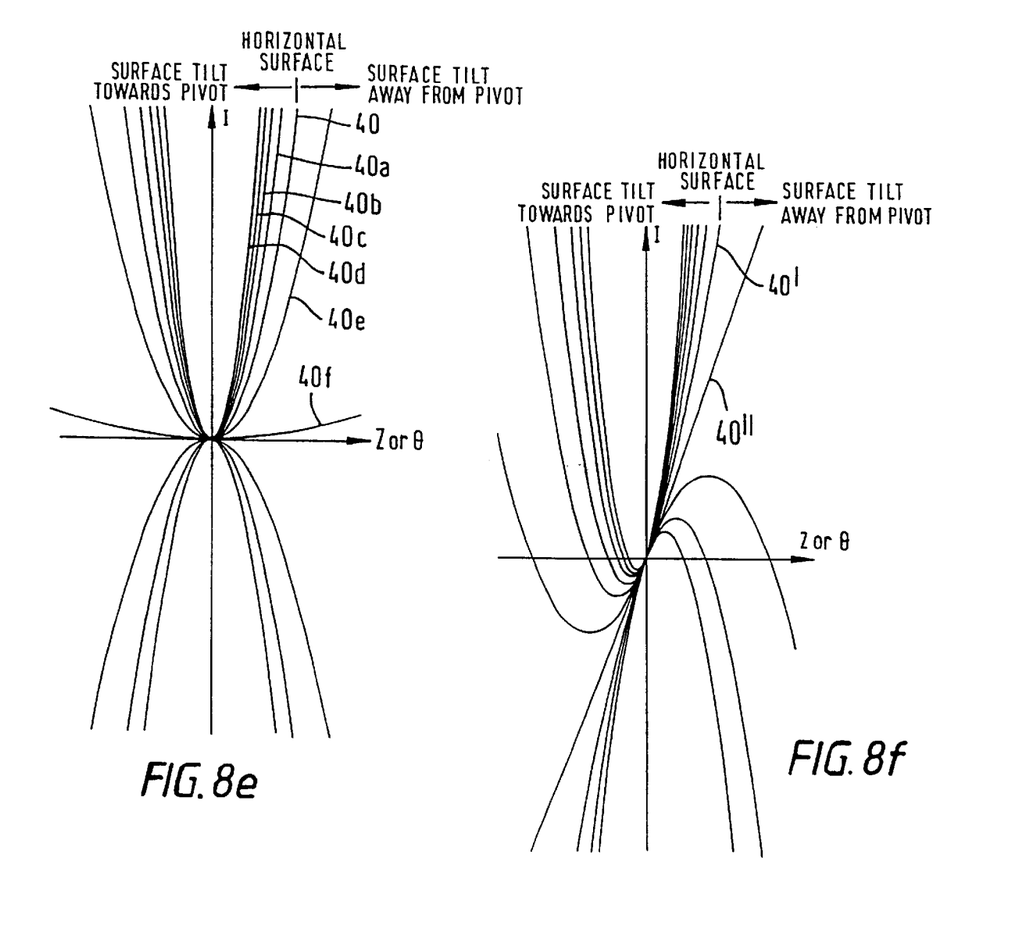

If the surface S being measured is itself tilted by an angle α with respect to the reference plane (normally the horizontal) as illustrated diagrammatically by FIG. 8d, then the movement MO of the stylus tip 8a along the surface 5 is given by $$MO = R(1 - \cos\theta) \quad (16)$$

where R is the distance from the pivot axis 18 to the optical axis of the cube corner 91 and so the vertical movement VM of the cube corner 91

$$VM = R(1 - \cos\theta)\tan\alpha \quad (17)$$

and the total optical path length change OPL is given by $$OPL = \left(r - \frac{t}{2n}\right)\theta^2 + 2R(1 - \cos\theta)\tan\alpha \quad (18)$$

which using the small angle approximation gives:
FIG. 8e illustrates the parabolic error curves $$OPL = \left(r - \frac{t}{2n} + R\tan\alpha\right)\theta^2 \quad (19)$$

which would be obtained for an ideal apparatus, that is apparatus following equation 19. In FIG. 8e, the parabola 40 indicates the error curve obtained when the surface being measured is horizontal while the parabolas 40a to 40d indicate the error curves as the flat surface S is progressively tilted toward the stylus support arm 7 and the parabolas 40e and 40f illustrate the error curves obtained when the surface is tilted away from the stylus support arm 7. As can be seen from FIG. 8e, the parabolas become narrower and wider, respectively, as the flat surface S is tilted towards or away from the stylus support arm 7. It should be noted that as Z=Rθ, Z and θ are equivalent for the purposes of this description.

The change in the interferometer reading I with θ is, for an ideal instrument, zero when $$\tan\alpha = \frac{t - 2nr}{2nR} \quad (20)$$

Thus, if a surface of a given slope angle α is being measured, the characteristics of the instrument (in particular R and r assuming t and n are normally fixed) may be adjusted to minimise the change in optical path length with θ. This may be achieved by, for example, providing a number of different plug in stylus support arms 7 which may have different lengths so giving different values of R or may have different mounting means to give different values of r. To take an example, if n=1.5151, t=8.8 mm and R=70 mm then for a slope angle α of −10.2°, r should be 15.5 mm to reduce any change in I with θ. It may also be possible to provide for some adjustment, by means for example of a screwthread telescopic mounting, of the height of the apex 91a above the stylus tip 8a on a single support arm 7.

The above calculations assume an ideal instrument. However in a practical instrument misalignment errors such as the fact that the stylus tip 8a may not be precisely aligned with the cube corner 91 apex 91a and the fact that the line between the stylus tip 8a and the pivot axis 18 may not be quite parallel to the top surface 91b of the cube corner 91 introduce into equation 19 an additional term εθ where ε is a factor dependent on the characteristics of the instrument.

FIG. 8f illustrates curves obtained in a manner similar to those shown in FIG. 8d for a practical apparatus or instrument. The parabola 40' indicates the error curve obtained when the flat surface is horizontal while the straight line 40" illustrates the situation when equation 20) is satisfied and so shows the effects on the interferometer reading I of the error term εθ. Again, the error curve parabolas decrease in width as the surface is tilted toward the support arm 7 and increase in width as the surface is tilted away from the support arm 7. In addition, in this case, the minimum of the parabolic error curve moves with the tilting of the flat surface.

It will be appreciated that operating on the flattest portions of an error curve enables the largest range of movement ΔZ of the carriage 6 along the support column 5 for a given desired maximum error ΔI. The flattest portion of the parabolic error curves is around the minimum or maximum of the parabola. FIG. 8f illustrates that, for a non-ideal apparatus or instrument, the range of movement along the support column 5 for which the error ΔI in the interferometer reading I is kept to a desired minimum may be offset from the zero of the Z axis and that this offset may vary in dependence upon the inclination of the surface being measured. An offset of the range ΔZ from the zero of the Z axis indicates that the support arm 7 should be maintained at an attitude other than horizontal so that the starting position of the carriage 6 is appropriately offset from the zero of the Z axis. Graphs similar to those shown in FIG. 8e may be derived for a given apparatus to enable an indication to be obtained of the optimum control attitude of the support arm 7 for a particular angle or tilt of a surface for that particular apparatus. Where a number of different support arms 7 defining different values of R and/or r are available similar graphs may be derived for each support arm. This enables the most appropriate support arm 7 and a particular angle or control attitude for that support arm 7 to be selected when measuring a surface known to have a particular angle of inclination. Adjustment of the control attitude of the support arm 7 may be achieved by supplying appropriate signals to the microprocessor 35b so as to adjust the value to which it maintains the output of the optical transducer or LVDT. As another possibility, adjustment of the control attitude of the support arm 7 may be performed by the slave microprocessor 35b. Thus, by monitoring the interferometer signals at the same time as moving the carriage the slave microprocessor 35b may determine the turning point (maximum or minimum) of the interferometer signals. The output of the optical transducer or LVDT at this point is then set as the control point during the subsequent measurement.

Although the apparatus has been described above with reference to the measurement of the profile of a surface which projects radially of an object, for example, a surface such as a video drum cam surface, the apparatus may also be used for the measurement of the surface profile of a surface extending generally parallel to the turntable 4, that is perpendicular to the spindle axis 4a. To enable measurements across such a surface to be made, the surface being measured may be mounted on a moveable carriage as in the paper by Franks discussed above. As another possibility, the housing 70 of the support arm 7 within the carriage 6 may itself be moveable with respect to the carriage 6 in a direction parallel to the length of the support arm 7 to allow the support arm 7 to move across the surface. Any suitable moving arrangement, for example a cable and pulley, sprocket wheel and chain or a rack and pinion arrangement may be used to effect movement of such a carriage relative to the carriage 6.

It should be understood that although, as used herein, the term profile of a surface refers to the actual shape or overall form of that surface in a particular plane crossing through the surface, the measurement of a surface profile may include measurements of surface roughness and texture.

Although particular examples have been described above, various modifications and variations thereof are possible.

For example, the stationary part 90 of the interferometer may be mounted to the support column 5. As another possibility, light may be directed towards and away from the cube corner 91 using a fibre optic or other light guide arrangement so enabling the stationary part 90 of the interferometer to be located at a convenient place remote from the support column. It may also be possible to use measuring means other than an interferometer, for example it may be possible to couple an LVDT measurement device to the free end 7a of the support arm 7. Also, in the examples described above, the stylus 8 is arranged to contact and so follow the surface. However the stylus 8 may be arranged so as to, for example, maintain a fixed distance from the surface using a suitable form of optical sensing means.

What is claimed is:

1. Apparatus for measuring the profile of a surface, the apparatus comprising:

a column having a longitudinal axis;

a stylus mounting moveable along the longitudinal axis of the column;

a stylus arm carrying a stylus, the stylus mounting and the stylus arm having cooperating elements which together define a pivot axis about which the stylus arm is pivotable relative to the stylus mounting to allow an angle of the stylus arm relative to the stylus mounting to vary from a substantially constant angle to enable the stylus to follow the surface during relative movement between the stylus mounting and the surface;

a detector responsive to pivotable movement of the stylus arm to provide a detector signal having a value representing the angle of the stylus arm relative to the stylus mounting;

a drive arrangement for receiving the detector signal, the drive arrangement being responsive to the value of the detector signal to move, when the detector signal does not have a predetermined value, the stylus mounting along the longitudinal axis of the column until the detector signal has the predetermined value so that, as a result of this movement, the stylus arm is maintained at the substantially constant angle relative to the stylus mounting; and a measuring device comprising an interferometer mounted at a fixed location for measuring the displacement of the stylus as the stylus follows the surface.

2. Apparatus according to claim 1, further comprising a turntable for supporting an object having said surface.

3. Apparatus according to claim 1, wherein the substantially constant angle is at an angle relative to the horizontal.

4. Apparatus according to claim 1, wherein a control device is provided for adjusting the substantially constant angle.

5. Apparatus according to claim 4, wherein the control device is arranged to set the substantially constant angle at the angle of the stylus arm at which a predetermined output signal is provided by the measuring device.

6. Apparatus according to claim 5, wherein the control device is arranged to set the substantially constant angle at the angle at which the output signal is a maximum or a minimum.

7. Apparatus according to claim 1, wherein said measuring device includes a measuring element mounted to the stylus arm at a position opposed to the stylus, and wherein a distance in a direction perpendicular to the length of the stylus arm between a tip of the stylus and the measuring element is adjustable.

8. Apparatus according to claim 1, wherein said measuring device includes a measuring element mounted to the stylus arm at a position opposed to the stylus, and wherein at least a part of the support arm carrying the stylus and the measuring element is removable.

9. Apparatus according to claim 1, wherein the measuring device includes a measuring element mounted to the stylus arm adjacent the stylus.

10. Apparatus for measuring the profile of a surface, the apparatus comprising:

a column having a longitudinal axis;

a stylus mounting movable along the longitudinal axis of the column;

a stylus arm carrying a stylus;

the stylus mounting and the stylus arm having cooperating elements which together define a pivot axis about which the stylus arm is pivotable relative to the stylus mounting to allow an angle of the stylus arm relative to the stylus mounting to vary from a substantially constant angle to enable the stylus to follow the surface during relative movement between the stylus and the surface;

a stylus arm detector responsive to pivotal movement of the stylus arm to provide a detector signal having a value representing the angle of the stylus arm relative to the stylus mounting;

a drive arrangement responsive to the detector signal to move the stylus mounting along the longitudinal axis of the column so that, as a result of the movement, the detector signal value is maintained at a predetermined value and the stylus arm is maintained at the substantially constant angle relative to the stylus mounting; and a measuring device for measuring the displacement of the stylus as the stylus follows the surface, the measuring device comprising a measuring element mounted to the stylus arm at a position opposed to the stylus and a measuring element detector for detecting the position of the measuring element, wherein the measuring element comprises a retroreflector.

11. Apparatus according to claim 10, wherein the retroreflector comprises a corner cube.

12. Apparatus according to claim 11, wherein the retroreflector comprises a corner cube having an apex with the apex of the corner cube aligned with a tip of the stylus.

13. Apparatus according to claim 11, wherein the stylus arm detector comprises a linear variable differential transducer (LVDT) having one of its core and coil means coupled to an end of the stylus arm remote from the stylus, and wherein the drive arrangement comprises a feedback arrangement for driving the stylus arm to maintain a predetermined output from the LVDT.

14. Apparatus for measuring the profile of a surface, the apparatus comprising:

a column having a longitudinal axis;

a stylus mounting movable along the longitudinal axis of the column;

a stylus arm carrying a stylus;

the stylus mounting and the stylus arm having cooperating elements which together define a pivot axis about which the stylus arm is pivotable relative to the stylus mounting to allow an angle of the stylus arm relative to the stylus mounting to vary from a substantially constant angle to enable the stylus to follow the surface during relative movement between the stylus and the surface;

a stylus arm detector responsive to pivotal movement of the stylus arm to provide a detector signal having a value representing the angle of the stylus arm relative to the stylus mounting;

a drive arrangement responsive to the detector signal to move the stylus mounting along the longitudinal axis of the column so that, as a result of this movement, the detector signal value is maintained at a predetermined value so as to maintain the stylus arm at the substantially constant angle relative to the stylus mounting; and a measuring device for measuring the displacement of the stylus as the stylus follows the surface, the measuring device comprising a measuring element mounted to the stylus arm at a position opposed to the stylus and a measuring element detector for detecting the position of the measuring element, wherein the stylus arm detector comprises an optical transducer having a light emitter and a light receiver and the stylus arm carries an optical shutter for interrupting a light path between the light emitter and light receiver.

15. Apparatus according to claim 14, further comprising a carriage movably mounted to the column, wherein the stylus mounting is within the carriage and the drive arrangement is arranged to move the carriage along the column.

16. Apparatus according to claim 14, wherein the drive arrangement is operable to move the stylus off a surface being measured to enable the height of the surface above a reference surface to be measured.

17. Apparatus for measuring the profile of a surface, the apparatus comprising:

a column having a longitudinal axis;

a carriage having a front face defining an aperture and being mounted to the column so as to be movable along the column in the direction of the longitudinal axis of the column;

a stylus mounting provided within the carriage;

a stylus arm having a first end for carrying a stylus and a second end being mounted to the stylus mounting so that the first end of the stylus arm projects through the aperture, the stylus mounting and the stylus arm having cooperating elements which together define a pivot axis about which the stylus arm is pivotable relative to the stylus mounting to allow an angle of the stylus arm relative to the longitudinal axis of the column to vary from a substantially constant angle to enable the stylus to follow the surface during relative movement between the stylus and the surface;

a stylus carried by the first end of the stylus arm;

a detectable element carried by the second end of the stylus arm;

a stylus arm detector mounted within the carriage for providing a detector signal having a value representing the position of the detectable element relative to the stylus arm detector;

a drive motor for moving the carriage along the column;

a drive controller for receiving the detector signal, the drive controller being responsive to the value of the detector signal to cause, when the detector signal does not have a predetermined value, the drive motor to move the carriage along the column until the detector signal has the predetermined value, to maintain the stylus arm at the substantially constant angle relative to the longitudinal axis of the column; and a measuring device for measuring the displacement of the stylus as the stylus follows the surface, the measuring device comprising an interferometer having a measurement element mounted to the stylus arm at a position opposed to the stylus and a detector for detecting the position of the measuring element.

18. Apparatus according to claim 17, wherein the measuring element comprises a retroreflector.

19. Apparatus according to claim 17, wherein the measuring element comprises a corner cube.

20. A method of determining the height of a measurement surface above a reference surface using apparatus in accordance with claim 16, which method comprises determining the height of the measurement surface by using the measuring device to determine the displacement of the stylus when the stylus is at the measurement surface, then causing the drive arrangement to move the stylus off the measurement surface thereby causing the stylus arm to descend until the stylus reaches the reference surface and then determining the height of the reference surface by using the measuring device to determine the displacement of the stylus when the stylus is at the reference surface.

21. Apparatus for measuring the profile of a surface of a work piece, the apparatus comprising:
   a column having a longitudinal axis;
   a stylus mounting carried by and movable along the longitudinal axis of the column;
   means for rotating the work piece relative to a support;
   a stylus arm mounted to the stylus mounting and carrying a stylus;
   the stylus mounting and the stylus arm having cooperating elements which together define a pivot axis about which the stylus arm is pivotable relative to the stylus mounting to allow an angle of the stylus arm relative to the stylus mounting to vary from a substantially constant angle to enable the stylus to follow the surface of the work piece as the work piece is rotated relative to the support;
   a stylus arm detector responsive to pivotal movement of the stylus arm to provide a detector signal having a value representing the angle of the stylus arm relative to the stylus mounting;
   a drive arrangement responsive to the detector signal to move the stylus mounting along the longitudinal axis of the column so that as a result of this movement, the detector signal value is maintained at a predetermined value so as to maintain the stylus arm at the substantially constant angle relative to the stylus mounting; and
   an interferometer for measuring the displacement of the stylus as the stylus follows the surface.

22. Apparatus for measuring the profile of a cam surface on a video cassette recorder drum cam, the apparatus comprising:
   a turntable for supporting the video cassette recorder drum cam;
   a column having a longitudinal axis;
   a stylus mounting movable along the longitudinal axis of the column;
   a stylus arm mounted to the stylus mounting and carrying a stylus,
      the stylus mounting and the stylus arm having cooperating elements which together define a pivot axis about which the stylus arm is pivotable relative to the stylus mounting to allow an angle of the stylus arm relative to the stylus mounting to vary from a substantially constant angle to enable the stylus to follow the cam surface as the turntable is rotated while supporting the video cassette recorder drum cam;
   a stylus arm detector responsive to pivotal movement of the stylus arm to provide a detector signal having a value representing the angle of the stylus arm relative to the stylus mounting;
   a drive arrangement responsive to the detector signal to move the stylus mounting along the longitudinal axis of the column so that, as a result of this movement, the detector signal value is maintained at a predetermined value so as to maintain the stylus arm at the substantially constant angle relative to the stylus mounting; and
   a measuring device for measuring the displacement of the stylus as the stylus follows the cam surface, the measuring device comprising an interferometer having a measuring element mounted to the stylus arm at a position opposed to the stylus and a detector for detecting the position of the measuring element.

23. Apparatus for measuring the profile of a surface, the apparatus comprising:
   a column having a longitudinal axis;
   a stylus arm carrying a stylus;
   stylus mounting means for mounting the stylus arm, the stylus mounting means being movable along the column;
   the stylus mounting means and the stylus arm having cooperating elements which together define a pivot axis about which the stylus arm is pivotable relative to the stylus mounting means to allow an angle of the stylus arm relative to the stylus mounting means to vary from a substantially constant angle to enable the stylus to follow the surface during relative movement between the stylus and the surface;
   a stylus arm detector responsive to pivotal movement of the stylus arm to provide a detector signal having a value representing the angle of the stylus arm relative to the stylus mounting;
   a drive arrangement responsive to the detector signal to move the stylus mounting along the longitudinal axis of the column so that, as a result of the movement, the detector signal value is maintained at a predetermined value and the stylus arm is maintained at the substantially constant angle relative to the stylus mounting; and
   measuring means for measuring the displacement of the stylus as the stylus follows the surface, the measuring means comprising an interferometer having a measuring element mounted to the stylus arm at a position opposed to the stylus and a detector for detecting the position of the measuring element.

24. Apparatus for measuring the profile of a surface, the apparatus comprising:
   a column having a longitudinal axis;
   a carriage having a front face defining an aperture and being mounted to the column so as to be movable along the column in the direction of the longitudinal axis of the column;
   a stylus mounting provided within the carriage;
   a stylus arm having a first end for carrying a stylus and a second end and being mounted to the stylus mounting so that the first end of the stylus arm projects through the aperture, the stylus mounting and the stylus arm having cooperating elements which together define a pivot axis about which the stylus arm is pivotable relative to the stylus mounting to allow an angle of the stylus arm relative to the longitudinal axis of the column to vary from a substantially constant angle to enable the stylus to follow the surface during relative movement between the stylus and the surface;

a stylus carried by the first end of the stylus arm;

a detectable element carried by the second end of the stylus arm;

a stylus arm detector mounted within the carriage for providing a detector signal having a value representing the position of the detectable element relative to the stylus arm detector;

a drive motor for moving the carriage along the column;

a drive controller for receiving the detector signal, the drive controller being responsive to the value of the detector signal to cause, when the detector signal does not have a predetermined value, the drive motor to move the carriage along the column so that, as a result of this movement, the detector signal is maintained at the predetermined value, thereby causing the stylus arm to maintain the substantially constant angle relative to the longitudinal axis of the column; and a measuring device for measuring the displacement of the stylus as the stylus follows the surface, the measuring device comprising a measurement element mounted to the stylus arm at a position opposed to the stylus and a measuring element detector for detecting the position of the measuring element, wherein the measuring element comprises a retroreflector.

25. Apparatus for measuring the profile of workpiece surface, the apparatus comprising:

a turntable for receiving the workpiece;

a column having a longitudinal axis;

a carriage having a front face defining an aperture and being mounted to the column so as to be movable along the column in the direction of the longitudinal axis of the column;

a stylus mounting provided within the carriage;

a stylus arm having a first end and a second end; a stylus carried by the first end and the stylus arm being mounted to the stylus mounting so that the first end of the stylus arm projects through the aperture, the stylus mounting and the stylus arm having cooperating elements which together define a pivot axis about which the stylus arm is pivotable relative to the stylus mounting to allow an angle of the stylus arm relative to the stylus mounting to vary from a substantially constant angle to enable the stylus to follow the surface as the work piece is rotated by rotation of the turntable;

a detectable element carried by the second end of the stylus arm;

a stylus arm detector mounted within the carriage for detecting the detectable element to provide a detector signal having a value representing the angle of the stylus arm relative to the stylus mounting;

a drive arrangement responsive to the detector signal to move the carriage along the column so that, as a result of this movement, the stylus arm is maintained at the substantially constant angle relative to the longitudinal axis of the column; and a measuring device for measuring the displacement of the stylus as the stylus follows the surface, the measuring device comprising a retroflector mounted to the stylus arm at a position opposed to the stylus and an interferometer having a reference and a measurement optical path with the retroflector being provided in the measurement optical path such that displacement of the stylus changes the measurement optical path.

* * * * *

UNITED STATES PATENT AND TRADEMARK OFFICE
CERTIFICATE OF CORRECTION

PATENT NO. : 6,401,349 B1
DATED : June 11, 2002
INVENTOR(S) : Peter Dean Onyon

It is certified that error appears in the above-identified patent and that said Letters Patent is hereby corrected as shown below:

Column 1,
Line 66, after "by", delete period.

Column 4,
Line 31, "comer" should read -- corner --.

Column 5,
Line 9, "comers" should read -- corner --.

Column 11,
Line 26, "a" should read -- $\sigma$ --.

Signed and Sealed this

Fifteenth Day of October, 2002

Attest:

Attesting Officer

JAMES E. ROGAN
Director of the United States Patent and Trademark Office